US00RE44784E

(19) United States
(12) Reissued Patent
Huang et al.

(10) Patent Number: US RE44,784 E
(45) Date of Reissued Patent: Mar. 4, 2014

(54) DANCE POLE

(75) Inventors: Jian Guo Huang, Guangdong (CN); Fox Marshall, London (GB)

(73) Assignee: DPDP, LLC, Reston, VA (US)

(21) Appl. No.: 29/400,096

(22) Filed: Aug. 23, 2011

Related U.S. Patent Documents

Reissue of:
(64) Patent No.: Des. 561,274
Issued: Feb. 5, 2008
Appl. No.: 29/223,318
Filed: Feb. 11, 2005

(30) Foreign Application Priority Data

Aug. 12, 2004 (GB) ..... 3018413

(51) LOC (10) Cl. ..... 21-02
(52) U.S. Cl.
USPC ..... D21/679
(58) Field of Classification Search
USPC ..... D21/662, 679, 691; D25/126; 482/148, 482/121, 122, 126, 51
See application file for complete search history.

(56) References Cited

U.S. PATENT DOCUMENTS

| | | | | |
|---|---|---|---|---|
| 4,824,302 | A * | 4/1989 | Schultheis et al. | 410/151 |
| 5,281,063 | A * | 1/1994 | Austin, III | 410/151 |
| D407,770 | S | 4/1999 | Thomas | |
| 5,944,464 | A * | 8/1999 | Cole, Jr. | 410/153 |
| 5,971,891 | A | 10/1999 | Humphrey | |
| 6,321,823 | B1 * | 11/2001 | Whittemore | 160/368.1 |
| 6,436,019 | B1 | 8/2002 | Hollowell | |
| D471,650 | S | 3/2003 | Dani | |
| D485,869 | S | 1/2004 | Miletich | |
| 6,689,030 | B1 | 2/2004 | Leslie | |
| 6,824,000 | B2 * | 11/2004 | Samelson | 211/105.3 |
| 2004/0220031 | A1 | 11/2004 | Blacker | |
| 2007/0293372 | A1 * | 12/2007 | Kessler | 482/51 |

* cited by examiner

*Primary Examiner* — Phillip S Hyder
(74) *Attorney, Agent, or Firm* — The Marbury Law Group, PLLC

(57) CLAIM

The ornamental design of a dance pole, as shown and described.

DESCRIPTION

FIG. 1 is a side elevational view of a dance pole showing my new design with the dance pole being shown in a retracted state;
FIG. 2 is a top plan view thereof;
FIG. 3 is a bottom plan view thereof;
FIG. 4 is a perspective view thereof;
FIG. 5 is a perspective view thereof with the dance pole being shown in an extended state;
FIG. 6 is a side elevational view of the dance pole shown in an extended state;
FIG. 7 is an enlarged perspective view of three segments of the dance pole shown as being separated from each other;
FIG. 8 is an enlarged side view of the segments of the dance pole of FIG. 7;
FIG. 9 is a top plan view of the segments of the dance pole of FIG. 8;
FIG. 10 is a bottom plan view of the segments of the dance pole of FIG. 8;
FIG. 11 is an enlarged perspective view of the segments of the dance pole of FIG. 7 with the top segment being shown in an extended state;
FIG. 12 is an enlarged side elevational view of the segments of the dance pole of FIG. 7 with the top segment being shown in an extended state; and,
FIG. 13 is a greatly enlarged fragmentary perspective view of a top portion of the dance pole of FIG. 1.

1 Claim, 10 Drawing Sheets

Figures 1, 2, 3:
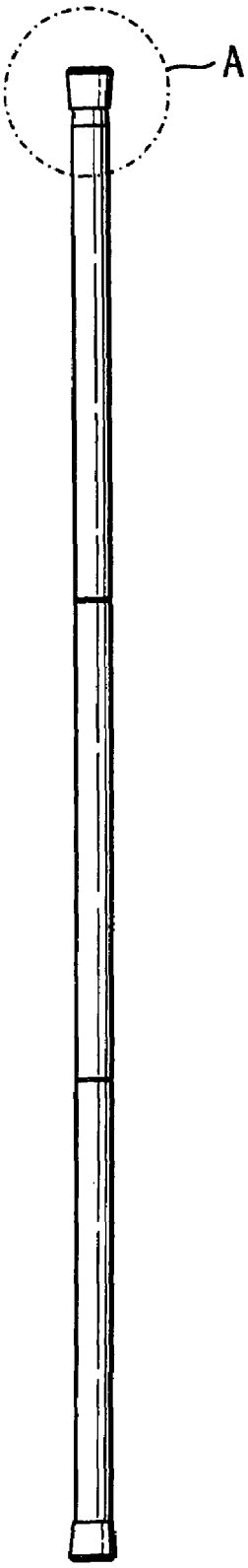
Figure 4:
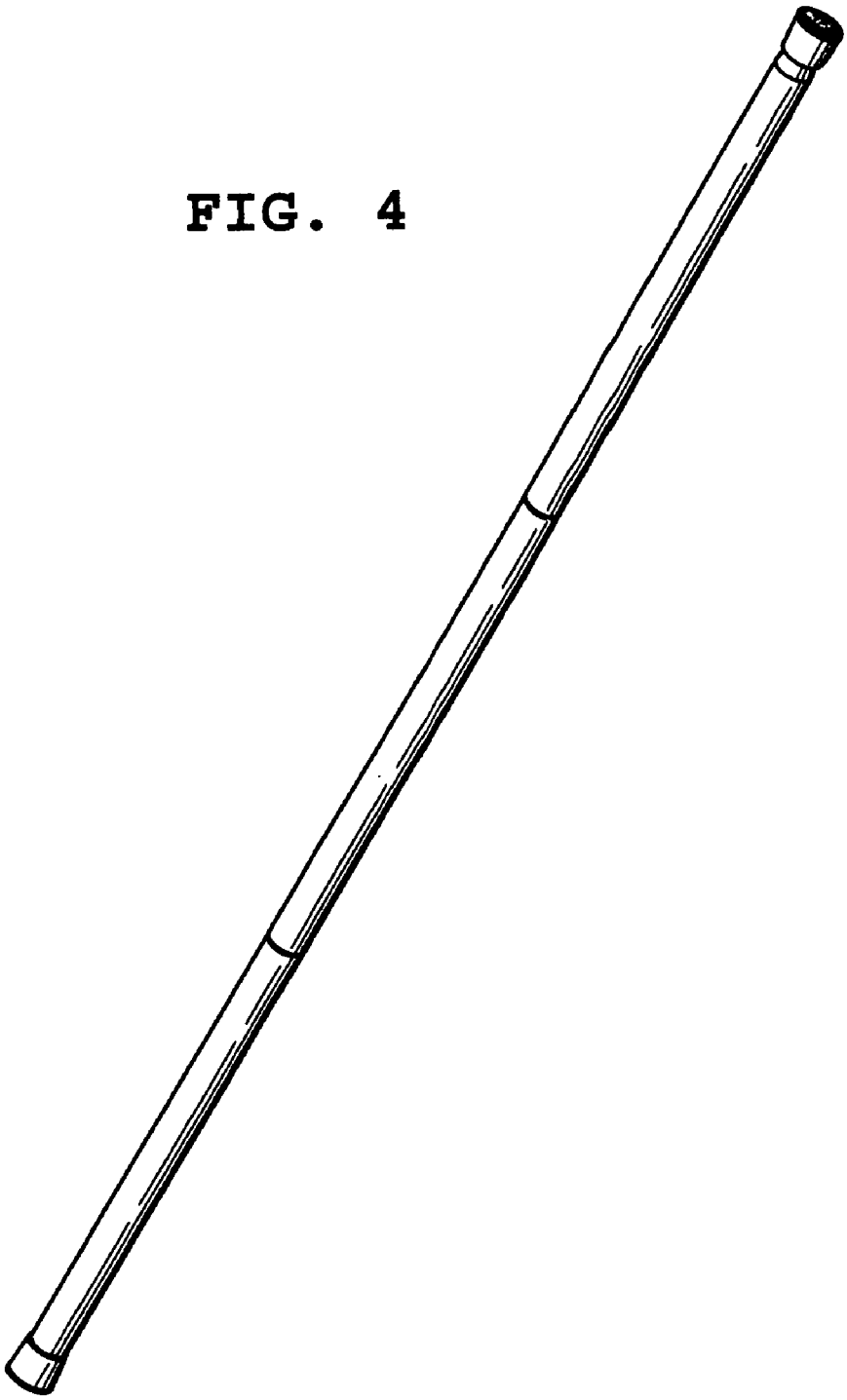
Figure 5:
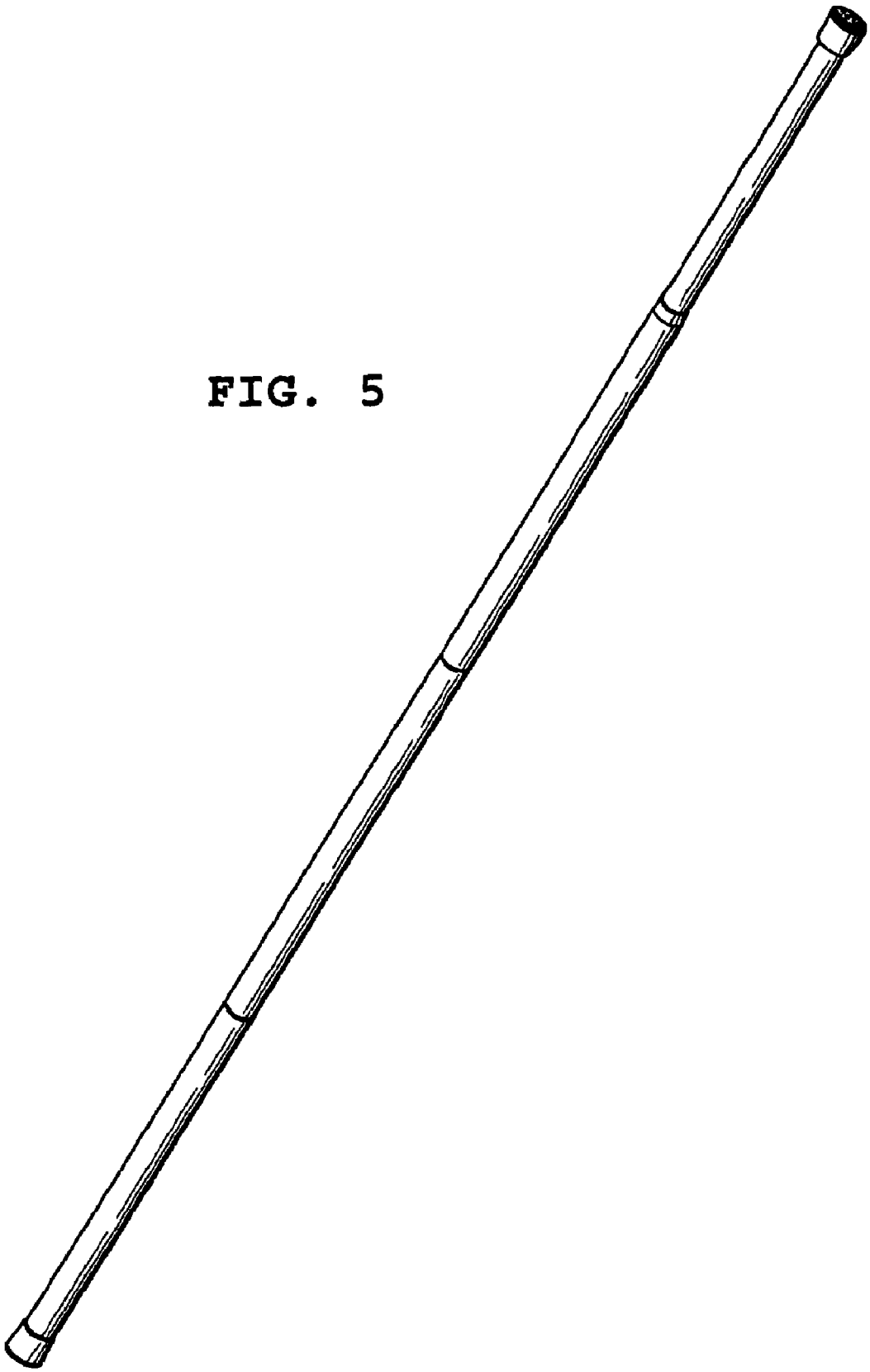
Figure 6:
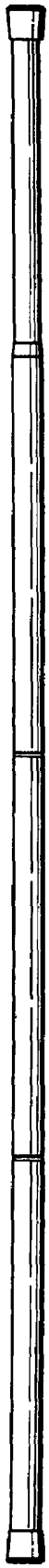
Figure 7:
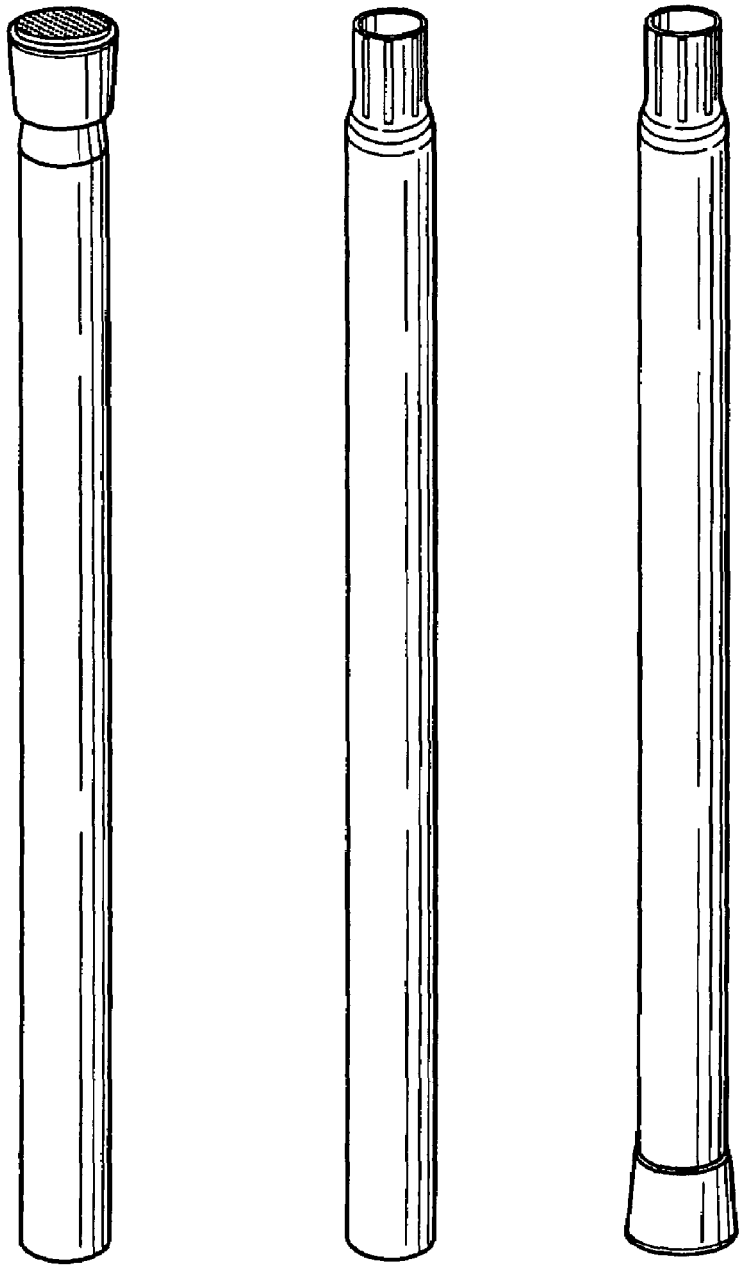
Figure 8:
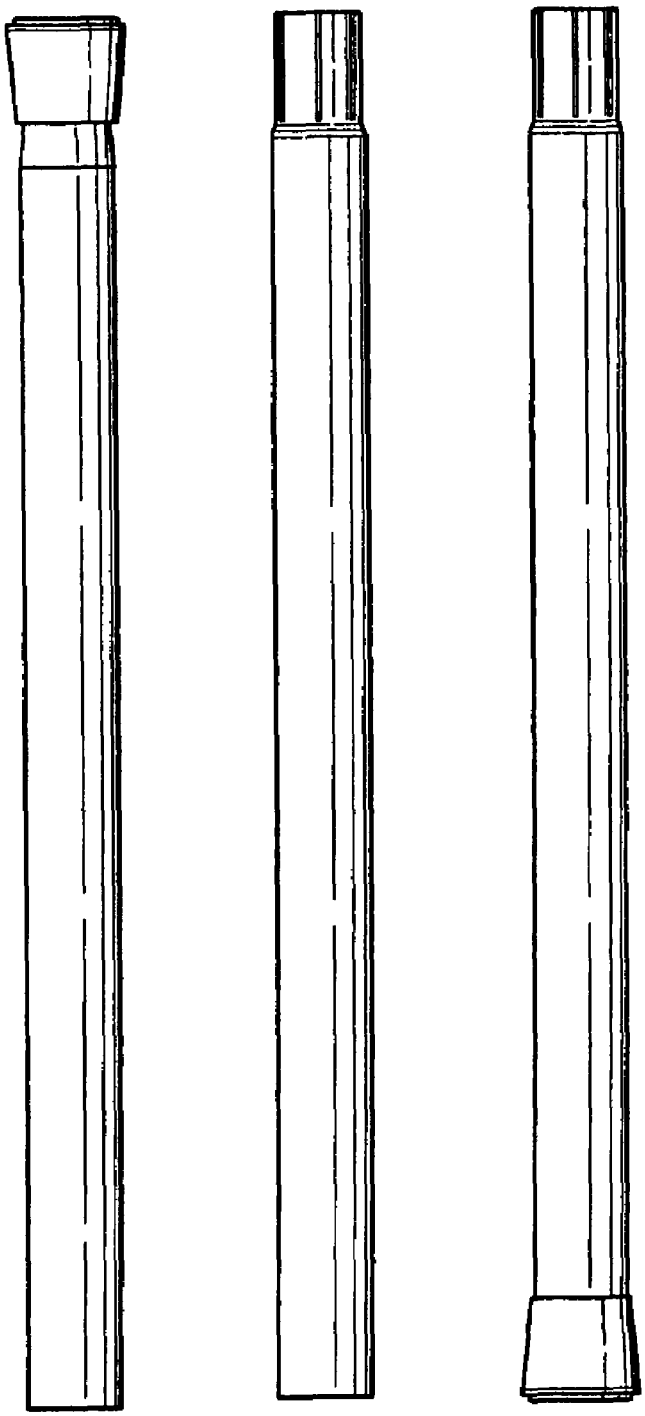
Figure 9:
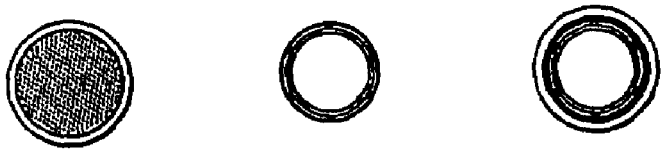
Figure 10:
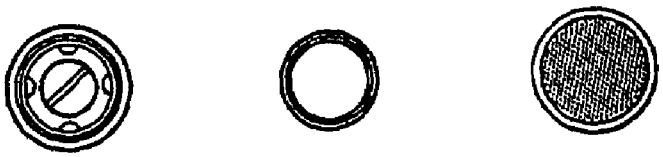
Figure 11:
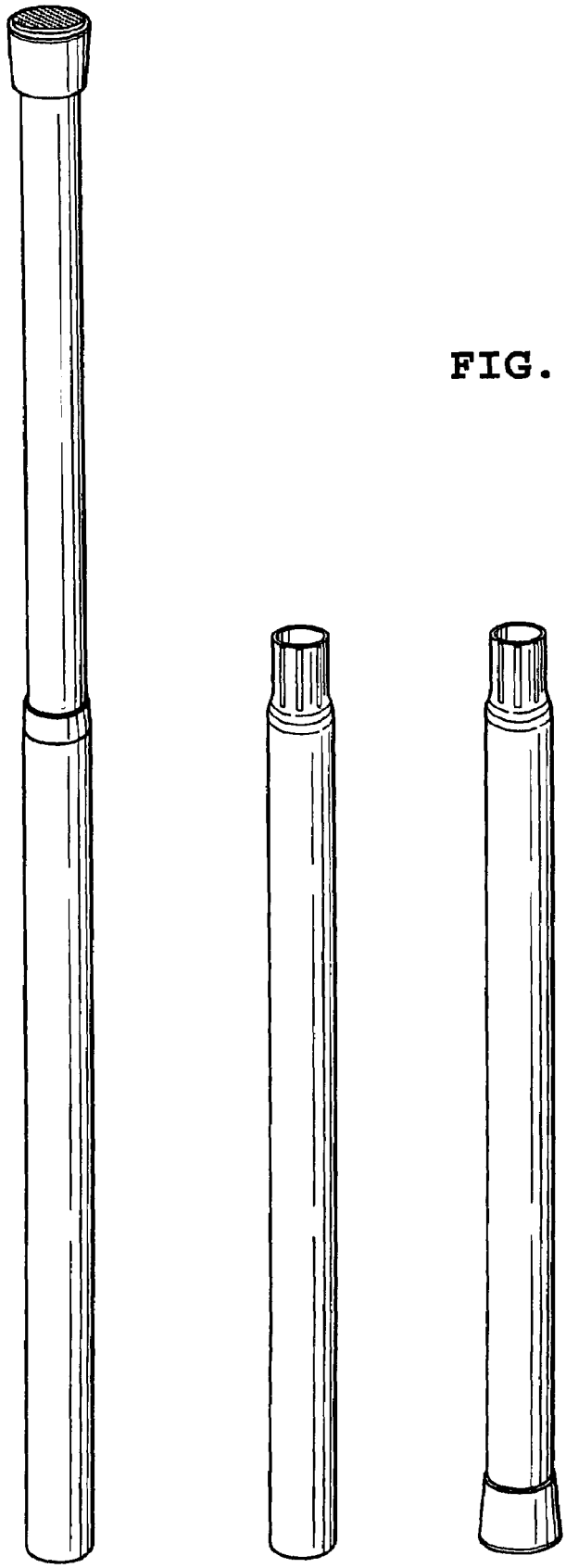
Figure 12:
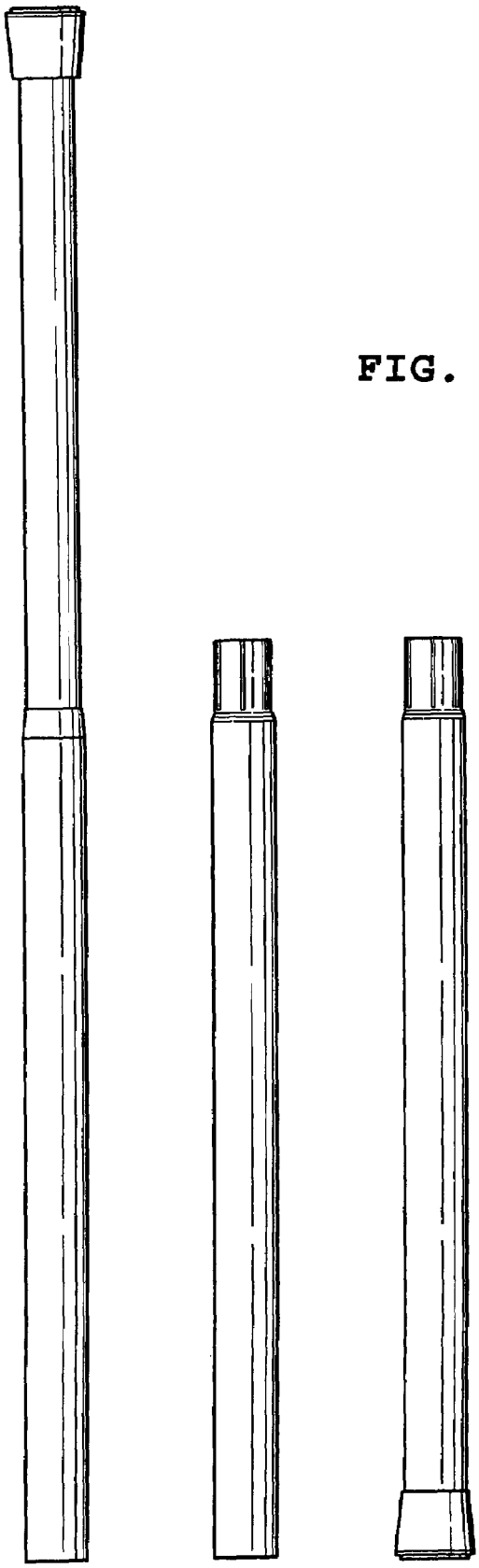
Figure 13:
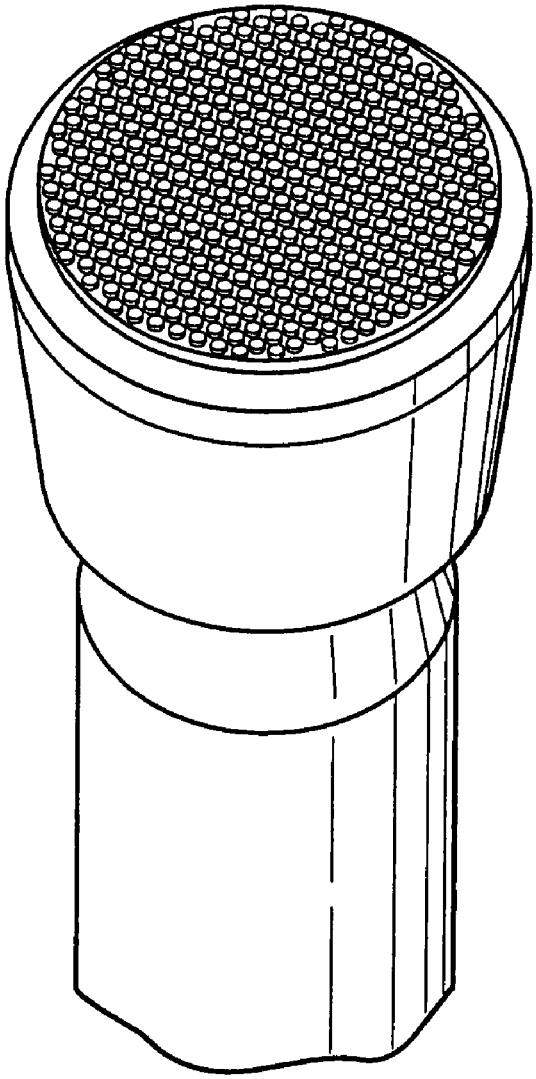

Matter enclosed in heavy brackets [ ] appears in the original patent but forms no part of this reissue; matter printed in italics indicates the additions made by reissue.